United States Patent [19]

Schiffelbein

[11] 4,402,148
[45] Sep. 6, 1983

[54] METHOD OF DIGGING AND TRANSPORTING TREES

[76] Inventor: Richard A. Schiffelbein, 3727 SE. 21st St., Topeka, Kans. 66605

[21] Appl. No.: 214,375

[22] Filed: Dec. 8, 1980

[51] Int. Cl.³ .................. B60P 3/00; A01G 23/04
[52] U.S. Cl. ...................................... 37/195; 37/2 R; 47/76; 296/3
[58] Field of Search .............. 37/2 R, 195; 47/76; 296/3; 410/31

[56] References Cited

U.S. PATENT DOCUMENTS

| | | | |
|---|---|---|---|
| 621,405 | 3/1899 | Garrett | 47/76 |
| 1,139,735 | 5/1915 | Spuhr | 47/76 |
| 3,017,719 | 1/1962 | Sigler et al. | 47/76 X |
| 3,032,368 | 5/1962 | Sigler et al. | 47/76 X |
| 3,778,098 | 12/1973 | Tawara | 296/3 |
| 3,782,773 | 1/1974 | Mason | 47/73 X |
| 3,936,960 | 2/1976 | Clegg | 47/76 X |

*Primary Examiner*—Clifford D. Crowder
*Attorney, Agent, or Firm*—Edward L. Brown, Jr.

[57] ABSTRACT

A trailer for transporting root-balled trees comprising a plurality of cone-shaped receptacles having an open bottom and being pivotally mounted to the frame of the trailer about a horizontal axis so that the trees may be held in a reclined position during transit.

1 Claim, 6 Drawing Figures

METHOD OF DIGGING AND TRANSPORTING TREES

BACKGROUND OF THE INVENTION

The present invention relates to a new and improved method of transplanting trees which have reached an appreciable size with a substantial root ball structure.

In the early days, the transplanting of trees was accomplished by manually digging around the root structure of the tree and surrounding the root ball with burlap and rope. This was a very time-consuming method and the lifting of the tree by the trunk quite often damage the tree while the root structure was also damaged due to dehydration and oxidation.

More modern methods which have mechanized the digging function are illustrated in U.S. Pat. No. 3,032,368 to Sigler et al and U.S. Pat. No. 3,017,719 To Sigler, et al. Both of these related patents teach a transplanting method whereby the root ball of the tree is dug by an excavating machine, which inserts a series of spades into the ground surrounding the root structure and then rotates the spades once extended to completely sever the root ball from the adjacent ground. The tree is then elevated by the excavating machine with the ball being inserted in a collapsible liner which in turn is elevated by a crane and deposited in a plurality of trailer-mounted baskets for transportation. At the planting site, the tree is lifted from the trailer by the collapsible liner and deposited in a previously dug cavity. A release mechanism is then activated causing the liner to release the root ball as the sections of the liner are pulled from the ground.

The transporting trailer of the present invention is a much simplified system over that of the previously mentioned patents and utilizes a different type of excavating machine which drives four quadrantally spaced spades into the ground surrounding the root ball of the tree so as to fully sever the root system of the tree by linear extension of the spades in a radial pattern. The excavating machine then lifts the root ball and trunk of the tree so as to insert the tree in one of the receptacle pots of the transporting trailer. The spades of the excavating machine are then retracted leaving the tree and its associated root ball ready for transit. The present system eliminates the intermediate collapsible liner required in the system shown in the above-mentioned patents. At the planting site, the excavating machine is again placed over the tree and receptacle pot so that as the spade members are extended they slide between the walls of the receptacle pot and the root ball of the tree. The tree is then elevated by the excavating machine and deposited in a previously dug ground cavity. The plug of earth removed from the ground cavity can be carried in one of the receptacle pots and at a later time inserted in the cavity left at the original tree-removal site, if desired. The system of the present invention not only eliminates the steps involved with placing the balled tree in the collapsible liner and then removal, but also the requirement of a crane for lifting and placing the collapsible liner. The receptacle pot of the present invention, with the exception of its bottom opening, is impervious to moisture and air so that the root ball does not dry out nor is it subject to excessive oxidation.

Therefore it is the principal object of the present invention to provide a new and improved system for transporting one or more trees to a new location with a single trip.

Another object of the present invention is to provide a new and improved tree transporting trailer for transporting relatively large trees a substantial distance with reduced damage to the tree.

The above objects and additional objects and advantages will become apparent to those skilled in the art from reading of the following detailed description of the preferred embodiment of the invention when taken in conjunction with the accompanying drawing.

DESCRIPTION OF THE PREFERRED EMBODIMENT

Figure 1:
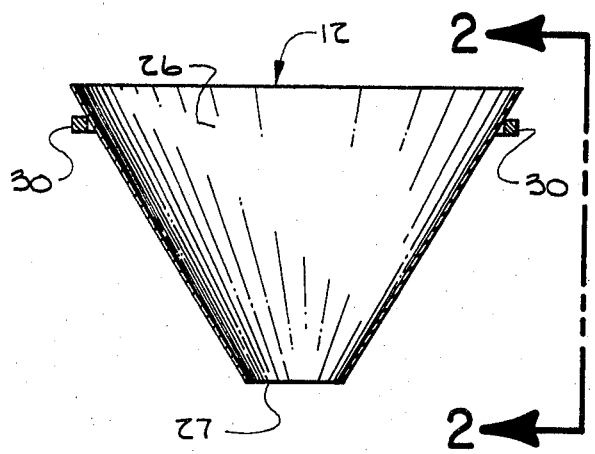
FIG. 1 is a vertical sectional view of one of the receptacle pots along line 1—1 of FIG. 4.
Figure 2:
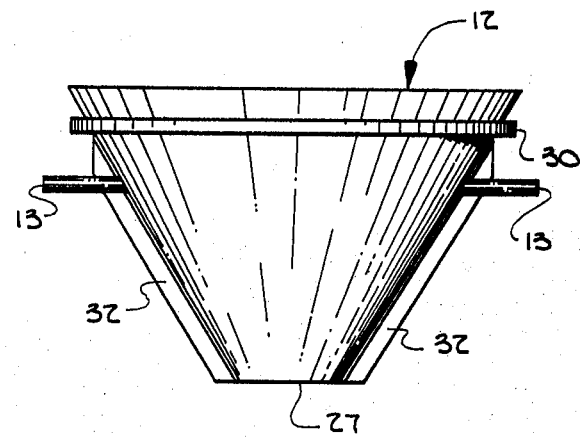
FIG. 2 is a side elevational view of a receptacle pot taken along line 2—2 of FIG. 1.
Figure 3:
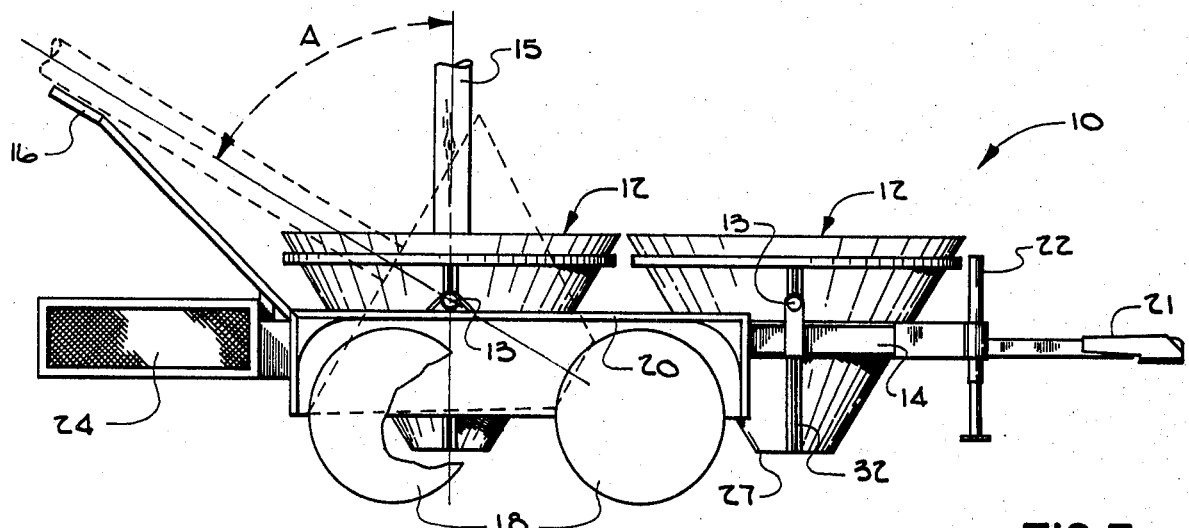
FIG. 3 is a side elevational view of the trailer with one of the pots shown in dotted line in its transport position.
Figure 4:
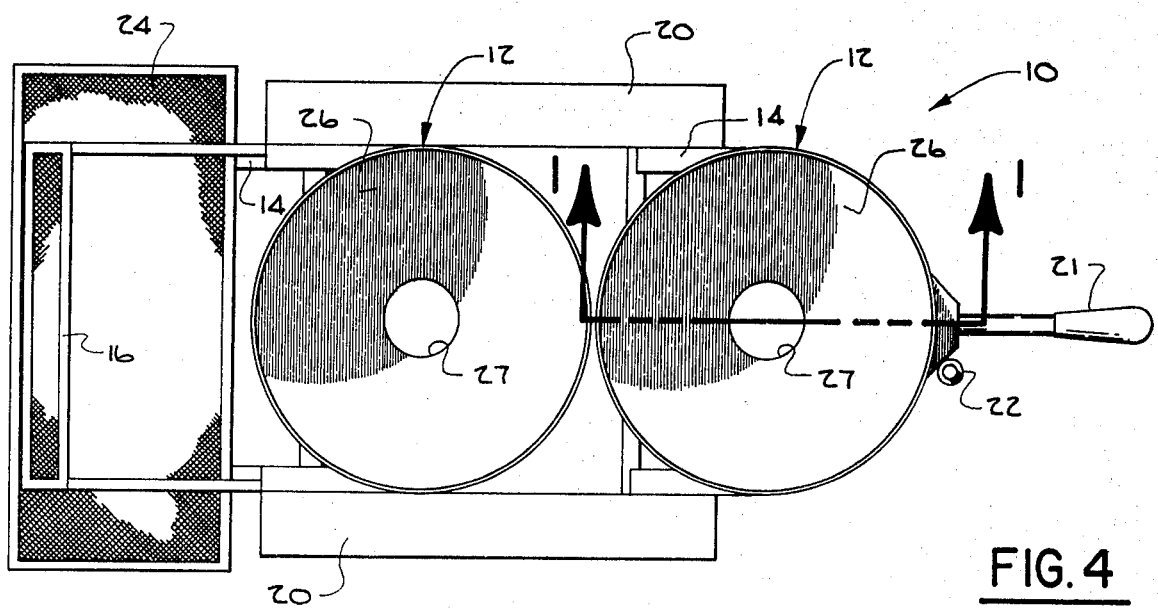
FIG. 4 is a top view of the trailer.

The transport trailer of the present invention generally described by reference numeral 10 is shown in FIGS. 3 and 4 in a two-receptacle form, while in FIG. 5 the trailer is in a four-receptacle form. The trailer 10 includes a pair of receptacle pots 12 pivotally mounted to the trailer frame 14 by a pair of trunions 13, as seen in FIG. 2. Trunions 13 permit the pot 12 to pivot about a horizontal axis, as seen in FIG. 3, so that the tree 15 can be tilted through an arc A to the transport position illustrated in dotted line in contact with support member 16.

The trailer 10 includes a pair of tandem wheels 18 covered by a fender 20. The trailer is pulled by a conventional hitch 21 which in turn is elevated or lowered by an attached conventional jack member 22. Positioned on the back of the trailer 10 is a tool storage locker 24.

Figure 6:
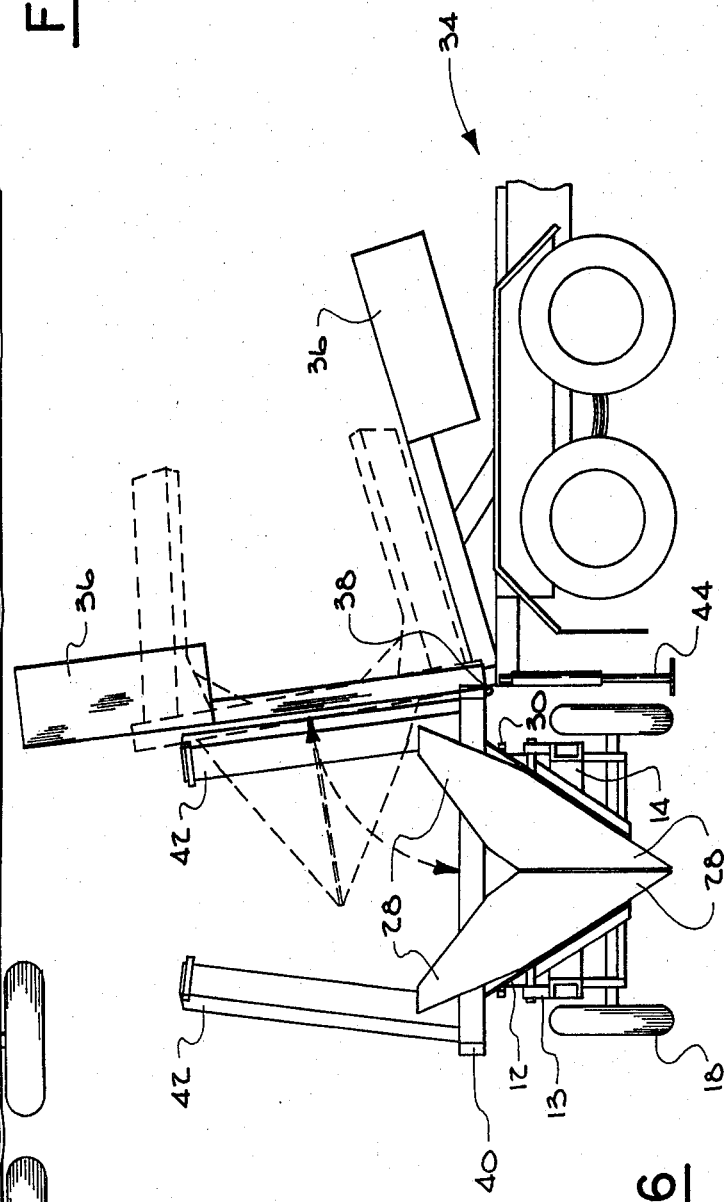
FIG. 6 is a side elevational view of a tree excavating machine engaged with one of the receptacle pots shown in section on the transport trailer.

The receptacle pots 12 are fabricated from sheet steel and have an interior surface shaped as a truncated cone which is identical in shape to the extended spades 28 of the excavator machine, shown in FIG. 6. Located at the bottom of pot 12 is an opening 27 through which the ends of spades 28 extend when in engagement with a pot 12. Located approximate the top edge of pot 12 is a circumferential ring member 30 which provides structural strength to the pot as also do ribs 32, as seen in FIG. 2.

The excavating machine which functions in conjunction with the transporting trailer 10 of the present invention is partially shown in side elevational view in FIG. 6 and is generally identified by reference numeral 34. Machine 34 which is mounted on the rear end of a tandem-axle truck, includes a mast member 36 which can be tilted about a horizontal axis 38 by hydraulic means not shown in the drawing. Attached to the front side of mast 36 is a table structure 40 which is allowed linear movement up and down on mast 36. Positioned at the four corners of table 40 are four spade members 28 which each have a guide bracket 42 which allows the spades to move outward and upward from the position indicated in FIG. 6 to a retracted position. Also included, but not shown in the drawings, are actuator means located within the guide brackets 42 which move the spades between their retracted and extended positions. Located at the rear extremity of excavating machine 34 are a pair of support jacks 44 which are placed in engagement with the ground during use of the machine.

OPERATION

The first step of the transplanting process calls for placing the excavating machine in proximity over the tree which is to be transplanted. The machine 34 is backed up to the tree and the table 40 is lowered down to ground level around the trunk of the tree. The spade members 28 are in a retracted position above table 40 and outwardly spaced from each other. Once the table 40 is centered on the tree trunk, the spades 28 of the machine are driven downwardly and inwardly in a radial direction to their extended position, with the sides of each spade in contact with the sides of the adjacent spade. Once fully extended, the four blades 28 have completely surrounded the root structure of the tree and severed those roots along with the ball of dirt surrounding the root structure, whereupon the table 40 is elevated on mast 36, thereby lifting the tree and its root structure up out of the ground. In its elevated position, the excavating machine 34 is backed over a receptacle pot 12. With the table 40 centered over pot 12, the machine 34 lowers table 40 so that spades 28 come in contact with the interior surface 26 of pot 12, as seen in FIG. 6. The spades 28 are then retracted upwardly and outwardly, leaving the tree and its root ball in pot 12 ready for transport. Due to the height of some trees and the road clearance requirements, the pot 12 can be tilted about trunions 13 and fastened to support 16, so that the tree trunk lies in a reclining position, as shown in dotted line in FIG. 3.

When the trailer 10 and excavating machine 34 reach the planting location, the excavating machine first digs a hole for locating the tree and then inserts the plug of earth taken from the hole in one of the empty pots 12 on the trailer. The excavating machine 34 is then positioned over that pot 12 which contains the tree to be transplanted and the spades 28 are extended downwardly between the inside surface 26 of the pot and the root ball of the tree. Once fully extended, the table 40 on the excavator is elevated and the excavator is maneuvered to a position over the ground cavity where the tree is to be planted. The table 40 of the excavator is again lowered, thereby inserting the root ball into its new location. The spades 28 are then retracted and the excavator 34 is moved away from the newly planted tree.

Figure 5:
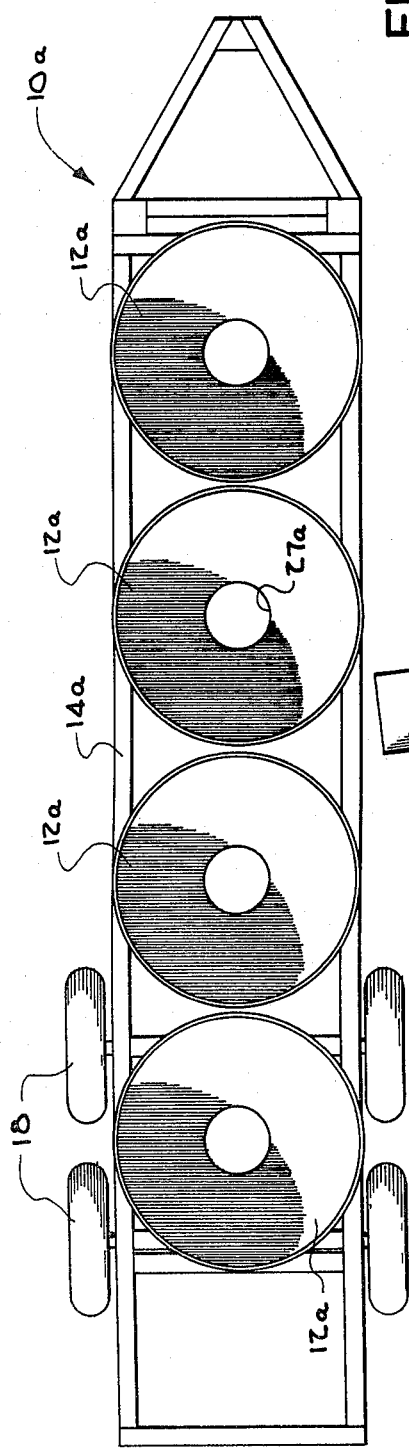
FIG. 5 is a top view of a modified form of the trailer which carries four receptacle pots.

FIG. 5 illustrates a modified trailer 10a which includes four rather than two receptacle pots 12a. Quite often more than one tree is being transplanted at the same location and therefore the job can be performed with a single trip.

Although only two embodiments of the preferred form of the invention has been described and illustrated, various other modifications within the spirit and scope of the invention will become apparent to those skilled in the art and can be made without departing from the underlying principles of the present invention. Therefore the invention should not be limited to the specific illustrations, but only by the following claims.

I claim:
1. A method of digging and transporting trees comprising the steps of:
   cutting the earth and roots surrounding a tree by a series of spades which move radially downward and inward from an excavating machine in a cone-shape;
   providing a trailer-mounted receptacle having an open bottom and a cone-shape substantially identical to the root ball
   lifting the root ball and tree by the excavating machine and depositing said ball and tree in said trailer-mounted receptacle for transport to the site of relocation;
   transporting said tree to the site of relocation;
   reengaging the ball and tree by extending the spades of the excavating machine between the ball and the receptacle until said spades project through the open bottom of the receptacle;
   lifting the ball and tree out of the receptacle with the excavating machine; and depositing the ball and tree in a ground cavity previously dug.

* * * * *